No. 733,795. Patented July 14, 1903.

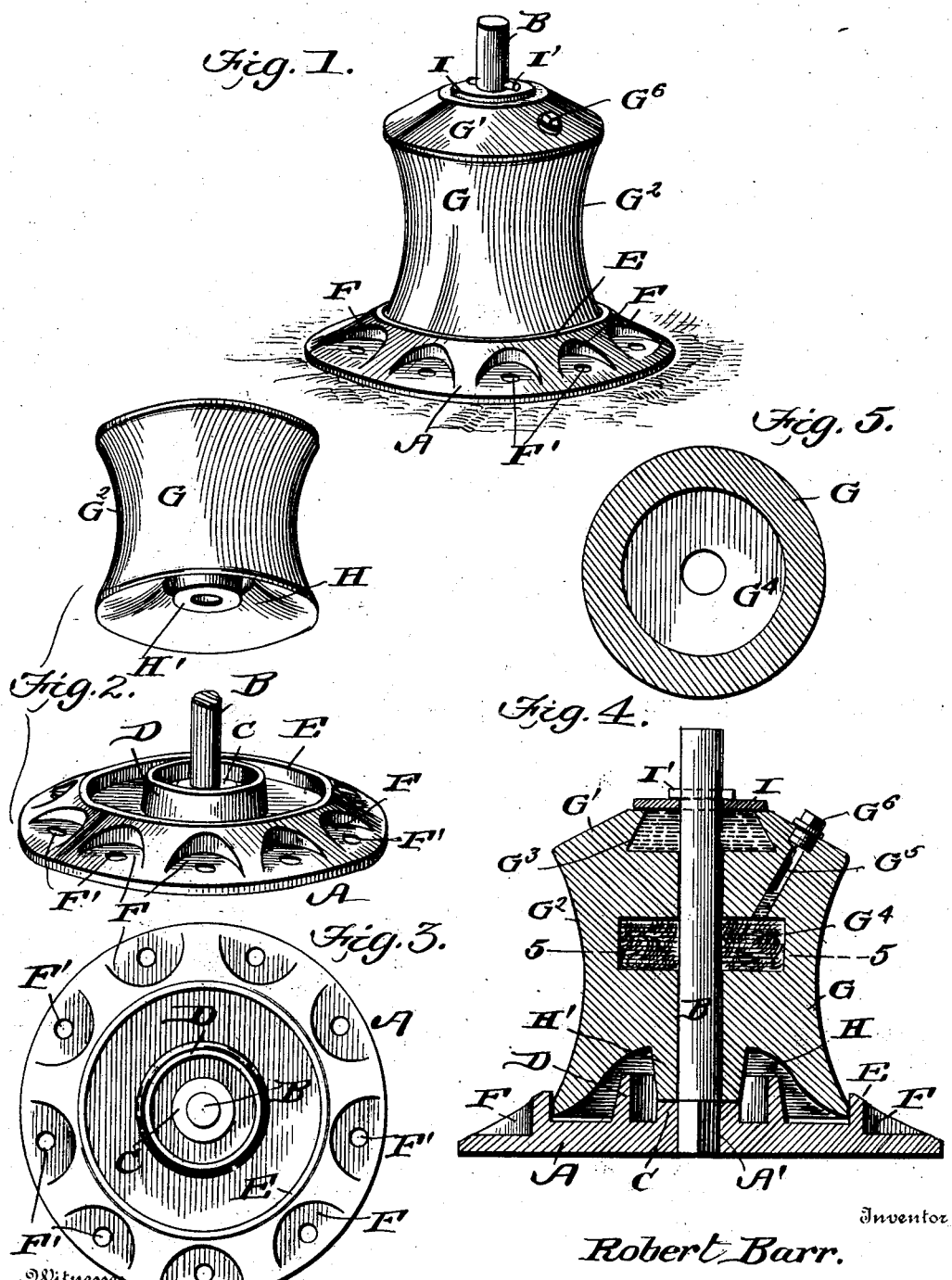

UNITED STATES PATENT OFFICE.

ROBERT BARR, OF CARROLLTON, WASHINGTON, ASSIGNOR OF ONE-HALF TO DANIEL J. FINN, OF PORTLAND, OREGON.

LOGGING-SPOOL.

SPECIFICATION forming part of Letters Patent No. 733,795, dated July 14, 1903.

Application filed February 25, 1903. Serial No. 145,065. (No model.)

*To all whom it may concern:*

Be it known that I, ROBERT BARR, a citizen of the United States, residing at Carrollton, in the county of Cowitz and State of Washington, have invented a new and useful Improvement in Logging-Spools, of which the following is a specification.

This invention is a spool to be used in logging operations for the purpose of guiding or directing the course of the chain or cable employed for hauling the logs.

Heretofore in hauling logs the operation has been accomplished by means of a chain drawn by any suitable power and to which the logs have been connected and the logs have been drawn along a straight way, inasmuch as it has been impossible to operate the chain or cable over a crooked course. My spool is designed to obviate this difficulty, and by arranging the spool at predetermined points the chain or cable employed for hauling the logs can be made to travel any desired course, either straight or crooked; and with this object in view the invention consists, essentially, in the employment of a base capable of being rigidly fixed, a spindle or shaft projecting upwardly therefrom, and a spool journaled upon the spindle or shaft and adapted to turn thereon as the chain or cable contacts therewith.

The invention consists also in certain details of construction and novelties of combination, all of which will be fully described hereinafter and pointed out in the claims.

In the drawings forming part of this specification, Figure 1 is a perspective view of a spool constructed in accordance with my invention. Fig. 2 is a view showing the base and a portion of the spindle or shaft connected thereto and an inverted perspective view of the spool proper. Fig. 3 is a top plan view of the base and spindle or shaft. Fig. 4 is a vertical longitudinal sectional view of the device, the spindle or shaft being shown in elevation. Fig. 5 is a section on the line 5 5 of Fig. 4.

In the practical employment of my invention I employ a base A, which is made of metal and any size or shape desired, said base having a central aperture $A'$, in which is fixed the spindle or shaft B. This spindle or shaft B, however, may be connected to the base in any suitable manner. The base is provided with a short central boss C, and this is surrounded by means of an annular flange D slightly higher than the boss C, and adjacent to the outer edge of the base is another annular flange E. The surface of the base between the outer edge and the flange E is recessed, as shown at F, each recessed portion having a bolt-opening $F'$, through which bolts or spikes can be passed for the purpose of fastening down the base.

A spool G, having a central vertical bore, is arranged upon the vertical spindle or shaft B, said spool having a beveled top $G'$ and concaved sides $G^2$. A circular chamber $G^3$ is produced in the top, and in which ways a lubricating material can be inserted, and the spool is also provided with a chamber $G^4$, which is adapted to receive and hold a lubricant, such lubricant being introduced through the channel $G^5$, extending downwardly from the beveled top, which channel is closed by means of a screw-plug $G^6$. The lower end of the spool is concaved or hollow, as shown at H, and is formed with a downwardly-extending hub $H'$, which rests upon the boss C. The lower end of the spool, however, extends into the annular space between the annular flanges D and E, and all foreign matter is thereby prevented from passing inwardly and clogging the spool. A circular plate I is placed upon the top of the spool and is held there by means of a key $I'$ passing transversely through the spindle or shaft directly above the cap-plate I.

In operation the spools are arranged at suitable points and the chain or cable employed for hauling the logs passed around the same, and the logs to be hauled are then connected to the said chain or cable, and when the chain or cable is drawn it will be guided around each and every spool, carrying with it the log or logs connected thereto, and by this construction the logs can be transported over a circuitous course, whereas heretofore it has been necessary to draw them in a straight line. Furthermore, in operation I prefer to connect a small cable to the hauling-cable, so that the said hauling-cable can be drawn back to its starting-point after the log or logs have been hauled to the point desired.

Having thus fully described my invention, what I claim as new, and desire to secure by Letters Patent, is—

1. A device of the kind described comprising a base having a central boss, annular flanges and apertured recesses, a spindle or shaft connected to the base and extending centrally therefrom, and a spool having a beveled top, concaved sides and concaved bottom having a central dependent hub portion, said spool also having lubricating-chambers arranged and adapted to operate substantially as described.

2. In a logging-spool the combination with a base-plate having a square bore, of a boss around said bore, an annular, upwardly-extending flange integral with the base and surrounding said boss, an outer annular flange encircling the first-mentioned flange, a vertical spindle having a squared lower end, a spool having a concave bottom and a central, depending hub resting on the boss of the base-plate, said spool having a circular upwardly-open recess in its upper portion, and a detachable plate fitting around the spindle and covering said recess.

ROBERT BARR.

Witnesses:
HARRY L. POWERS,
L. B. AVERY.